United States Patent
Chan et al.

(10) Patent No.: US 6,446,232 B1
(45) Date of Patent: Sep. 3, 2002

(54) DISTRIBUTION OF MODEM ERROR CORRECTION AND COMPRESSION PROCESSING

(75) Inventors: Virginia M. Chan, Westminister; John E. MacCrisken, Palo Alto; David W. Fisher, Orange, all of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/564,143

(22) Filed: May 3, 2000

Related U.S. Application Data

(63) Continuation of application No. 07/887,193, filed on May 21, 1992, now abandoned.

(51) Int. Cl.$^7$ .......................... G06F 11/00; G06F 13/00
(52) U.S. Cl. ........................ 714/746; 709/237
(58) Field of Search ................ 714/789, 746; 709/237

(56) References Cited

U.S. PATENT DOCUMENTS

| | | | | |
|---|---|---|---|---|
| 4,623,936 A | * | 11/1986 | Urban et al. | 358/284 |
| 4,700,358 A | * | 10/1987 | Duncanson et al. | 375/8 |
| 4,736,249 A | * | 4/1988 | Iizuka et al. | 358/257 |
| 4,837,634 A | * | 6/1989 | Hisada | 358/261.1 |
| 4,887,162 A | * | 12/1989 | Arai | 358/400 |
| 4,893,333 A | * | 1/1990 | Baran et al. | 379/100 |
| 4,965,641 A | | 10/1990 | Blackwell et al. | 375/7 |
| 4,970,603 A | * | 11/1990 | Kanai | 358/400 |
| 5,001,571 A | * | 3/1991 | Murano | 358/434 |
| 5,077,742 A | * | 12/1991 | Tsumura et al. | 371/32 |
| 5,105,423 A | * | 4/1992 | Tanaka | 371/5.5 |
| 5,159,465 A | * | 10/1992 | Maemura et al. | 358/403 |
| 5,270,805 A | * | 12/1993 | Abe et al. | 358/500 |
| 5,293,388 A | * | 3/1994 | Monroe et al. | 371/37.1 |
| 5,557,752 A | * | 9/1996 | Remion | 395/285 |

OTHER PUBLICATIONS

ANSI/EIA/TIA–578–1990, "Asynchronous Facsimile DCE Control Standard—Service Class I", Nov. 1990.*
Lindsay, "SENDFAX (TM) A Single Chip Fax and Data Modem", IEE Colloquium on Circuits and Devices for Data Communications, 1989, pp. 3/1–3/5, Dec. 1989.*
"Supra Technical Support Bulletin Class 1 Fax Commands for Supra Faxmodems jUN. 19, 1992", pp. 1–11.*
Krechmer, "Applications Programming Interfaces for Communications (Programmable Communications Interfaces)", International Conference on Data Transmission –Advances in Modem and ISDN Technology and Applications, 1992, pp. 128–131, Dec. 1992.*

(List continued on next page.)

Primary Examiner—Stephen M. Baker
(74) Attorney, Agent, or Firm—Akin Gump Strauss Hauer & Feld, LLP

(57) ABSTRACT

A method and apparatus for distributing the data error correction and compression processing load between a modem (DCE) and a host data terminal equipment (DTE) enables modem implementation with minimal cost, power dissipation, and size. The DTE has a CPU and an associated memory. The memory contains a data transmission program for execution by the CPU to produce output data for transmitting, and at least a data compression algorithm and a data error checking algorithm for execution by the CPU under control of the data transmission program to asynchronously deliver data according to the data transmission program to a modem for synchronous transmission. The modem included in the DCE asynchronously received the data from the DTE and synchronously transmits it as output data. Due to the distribution of the data processing algorithms into the memory of the DTE, the DCE can be operated simultaneously in communication and control modes. Moreover, the modem can be controlled during data transmission or reception in response to a <DLE> code in combination with a predetermined control code.

7 Claims, 4 Drawing Sheets

OTHER PUBLICATIONS

Gray, "Fax Technology Tutorial and Testing Issues" Agilent Technologies White Paper, pp. 1–24, Oct. 2000.*

Translation of D1; (pp. 1–7);.

Durchschlag von PC zu PC; Telekommunikation; Funkschau 13/1988; (pp. 42–44).

Modem–Normen V–Serie im Blickpunkt; Telekommunikation; Fonkschau Mar. 1990; (pp. 36–38).

ACM Siguccs User Services Conference XVII; "Capitalizing on Communication"; The Bethesda Hyatt Regency, Bethesda, Maryland, Oct. 1–4, 1989.

Held, Gilber; Data Compression; Techniques and Applications Hardware and Software Considerations; Wiley & Sons; (pp. 86–94); Copyright (c) 1983 by Wiley Heyden, Ltd.

International Telecommunication Union; Series V: Data Communication Over the Telephone Network—Error Control/Error–Correcting Procedures for DCEs Using Asychronous–to–Synchronous Conversion, vol. 42 (Oct. 1996).

* cited by examiner

DISTRIBUTION OF MODEM ERROR CORRECTION AND COMPRESSION PROCESSING

CROSS-REFERENCE TO RELATED APPLICATION

This application is a continuation of U.S. patent application Ser. No. 07/887,193, filed May 21, 1992, now abandoned, which is hereby incorporated by reference herein in its entirety.

BACKGROUND OF THE INVENTION

1. Field of the Invention

The invention relates to improvements in methods and apparatus for the transmission and reception of communications information, and more particularly to an improved method and apparatus for distributing data correction, compression, and decompression functions within transmitting and receiving hardware systems.

2. Technical Background

Requirements for communication between digital computers and computing machines are rapidly increasing, particularly with the increasing popularity of home or personal computers (PCs). Needs for improved communications with higher speeds and error free transmissions are increasing, in part due to increased user sophistication and desires to maximize the cost savings associated with shorter transmissions at higher speeds.

Techniques and algorithms for compressing user information exist today. Such techniques enable increased throughput rates and effective higher speeds. Additionally, techniques, algorithms, or protocols exist for providing error free information, and in fact, industry standards, such as "MNP" and "V.42" have been adopted in this regard.

Both MNP4 and V.42 provide synchronous error correction capabilities. In accordance with these protocols, information is grouped into packets and encoded with a cyclic redundancy check (CRC). When the packets are received, they are checked to insure that the CRC is correct and then passed to the data terminal equipment (DTE) for processing. If the CRC is found to be incorrect, the received block is discarded and a request is issued for the packet to be resent.

In the communication process, a connection is established between the two communicating nodes before the information packets are passed. This connection is established using an asynchronous data mode typically consisting of 7 or 8 bit information characters, framed by a leading start bit, a trailing stop bit and optional parity bit. During the asynchronous mode, the communicating nodes pass information to negotiate the actual MNP or V.42 correction/compression packet operating mode. Once the packet operating mode is negotiated, the two communicating nodes are switched to a synchronous mode and the information packets are transferred. In the synchronous mode, the information packets are framed by leading multiple 8-bit starting flag characters and trailing multiple 8-bit ending flag characters.

In order to implement these standards, increased processing capabilities and additional ROM and RAM are required. These additional requirements are currently provided in the data communication equipment (DCE). A standard DCE implementation without correction or compression generally contains a modem (modulator/demodulator), possibly a modem controller with memory, and miscellaneous glue logic. To upgrade the DCE to include full V.42 capabilities (MNP4,5, V.42, and V.42 bis) requires that the DCE be provided with an additional 16K–32K ROM and 16K–32K RAM and a controller with a processing bandwidth of 2 mHz. The range of values indicated are all implementation dependent. These additional components and requirements all contribute to an increased DCE system cost.

This increased system cost is not strictly monetary. The extra ROM and RAM as well as an additional controller, or an existing controller with increased operating speed, can easily increase the power dissipation of the design by 400 to 750 milliwatts. The added components can increase the required physical implementation space by as much as 2 to 3 square inches. Moreover, the actual data processing required of the DCE processor essentially precludes the DCE processor from other uses, if the data transmission is to be accomplished within a reasonable time.

Some applications, particularly lap top, notebook, and pocket computer implementations are size and power limited. Consequently, there exists a need for a method and apparatus which minimizes the DCE physical size and design complexity and redistributes processing and power requirements between the DTE and DCE.

SUMMARY OF THE INVENTION

In light of the above, it is, therefore, an object of the invention to provide an improved communication system of the type that includes a modem for data transmitting and receiving.

It is another object of the invention to provide an improved communication system of the type described in which the computer portion of the system can be implemented in any communication system having a CPU with sufficient memory and processing bandwidth such as an off-the-shelf personal computer, laptop computer, or the like.

It is another object of the invention to provide an improved modem system that can be used in conjunction with computer systems of the type described above, or the like, that does not require modification of the computer system hardware with which it is used.

It is another object of the invention to provide an improved modem system of the type described in which the hardware requirements of the modem can be greatly reduced.

It is yet another object of the invention to provide a modem system of the type described in which the data error correction and compression processing are not performed in the modem or its associated hardware.

It is yet another object of the invention to provide a modem system in which the cost, power dissipation, and size of the modem are reduced.

It is yet another object of the invention to provide an improved modem system of the type described in which the modem can be simultaneously operated in communication and command modes.

It is yet another object of the invention to provide a new protocol interface and command structure for protocol negotiation and modem configuration control by a host computer.

It is yet another object of the invention to provide an improved communication system that enables data transmission and receiving capabilities using existing industry standards, such as MNP and V.42.

It is yet another object of the invention to provide an improved modem system that is compatible with existing computer located modem control software interfaces.

It is yet another object of the invention to provide an improved modem system that enables a host computer to perform error correction and data compression and transfer data asynchronously to and from the modem, the modem adding and deleting asynchronous framing information from the data and synchronously communicating the data to a remote data communication system.

It is another object of the invention to provide an improved communication system employing a modem for data transmitting and receiving in which the data packetizing is performed by the computer and its associated hardware instead of by the modem and its associated hardware.

These and other objects, features and advantages of the invention will be apparent to those skilled in the art from the following detailed description of the invention, when read in conjunction with the accompanying drawings and appended claims.

In accordance with a broad aspect of the invention, a method and apparatus are provided to allow existing memory and processing resources resident in the DTE to be used for correction and compression processing, thus minimizing the DCE design and eliminating additional system costs, while providing a compatible MNP and V.42 capability with minimal DCE system components and cost.

It is another broad aspect of the invention to provide a communication system that includes a CPU and associated memory for containing instructions for sequential execution by the CPU. A modem is provided separate from the CPU and memory, the modem being operable in a data transmitting and receiving ("communication") mode and in a control mode. The modem is attached via data and control busses to the CPU. Circuitry is also provided in the modem for receiving commands from the CPU for causing the modem to operate simultaneously in both the control and data communication modes. "Communicate," as used herein, means to transmit data, to receive data, or to do both. The present invention is therefore applicable to transmit-only modems, to receive-only modems, and to modems which have the capability both to transmit and to receive data.

In accordance with yet another broad aspect of the invention, a modem system is presented for use with a host communication system that has a CPU and a memory. The modem system includes a modem connected to accept data and control information from the CPU as well as provide demodulated data and status/monitor information to the CPU. The modem system modulates transmit data provided by the CPU into transmit modem audio and demodulates receive modem audio into receive digital data to be provided to the CPU.

The CPU memory contains a program for execution by the CPU which supports the modem system data and control interfaces as well as data compression/decompression, error correction, and data packetization functions.

BRIEF DESCRIPTION OF THE DRAWINGS

The invention is illustrated in the accompanying drawings in which.

In the various figures of the drawing, like reference numerals are used to denote like or similar parts.

DETAILED DESCRIPTION OF THE PREFERRED EMBODIMENTS

Figure 1:
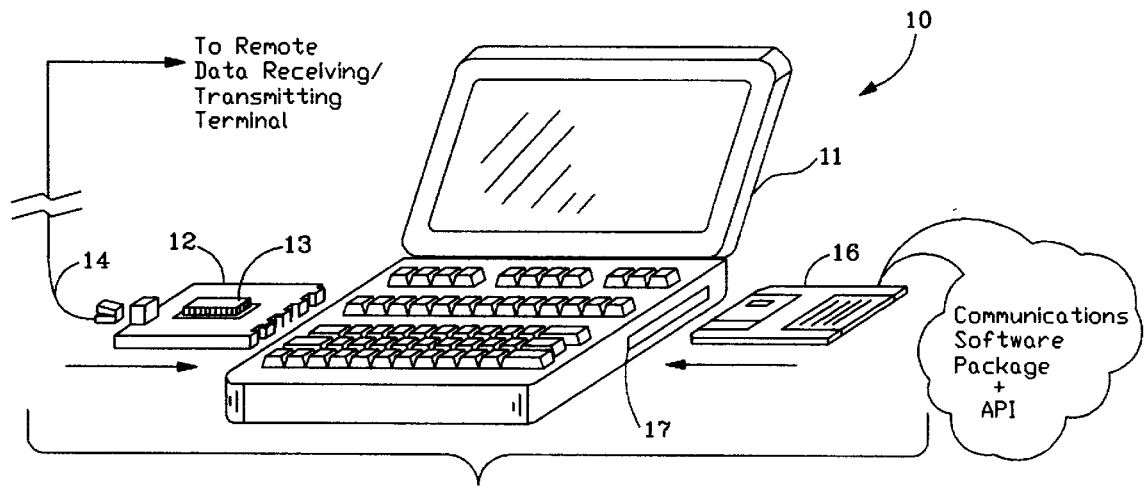
FIG. 1 is an exploded pictorial representation of communication system including the modem configuration, in accordance with a preferred embodiment of the invention.
Figure 2:
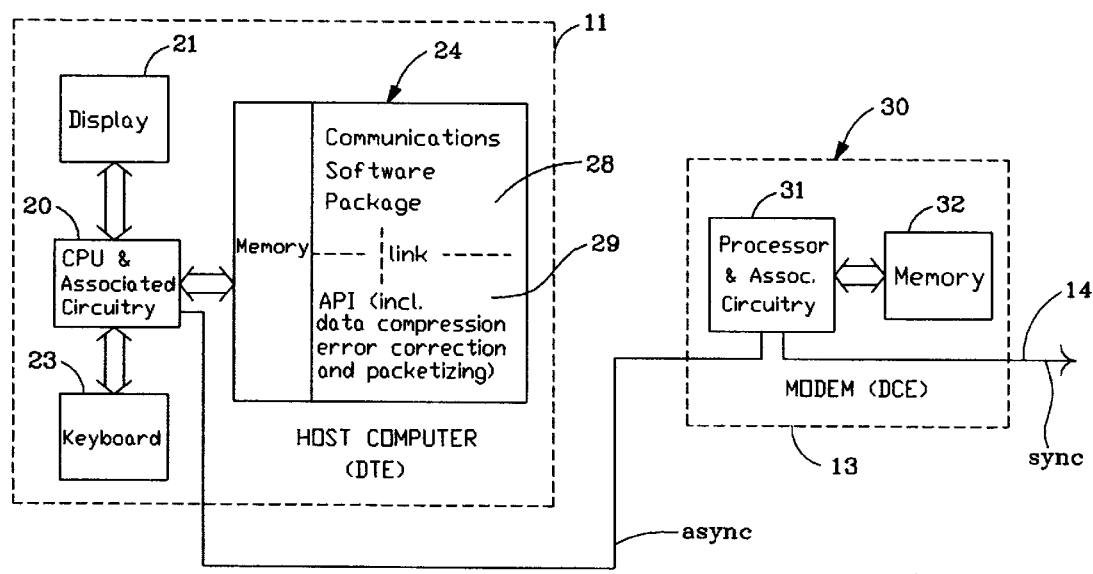
FIG. 2 is a box diagram showing the configuration of the hardware and software employed in the computer system of FIG. 1, in accordance with a preferred embodiment of the invention.

With reference to FIGS. 1 and 2 of the drawing, an example of a computer system 10 embodying apparatus in accordance with the preferred embodiment of the invention is shown. The system 10 includes a computer 11 that serves as a host computer and can be, for example, a personal computer, a lap top computer (as shown), or the like. The computer 11 can be a conventional digital computer, and may include, as shown, a keyboard on which commands and text may be entered, a display, an internally contained central processing unit (CPU) and its associated circuitry and equipment, a memory that may include both RAM and ROM memories, and hard and floppy disk drives, all as known in the art. It should be emphasized that although a personal, or laptop computer 11 is shown, the invention can be equally advantageously employed in conjunction with any system that minimally includes a CPU and memory. Such system can be provided, for example, by the CPU and memory of a laser printer, copy machine, facsimile apparatus, or the like. The computer 11 is referred to herein as "data terminal equipment" (DTE).

The host computer 11 includes a CPU and its associated circuitry 20 having an output that may be connected to a display 21. The display 21 can be, for example, an LCD display typically used with a lap top computer or the like. Input commands to the CPU may be provided via a keyboard 23, as well as text, numbers, or other data entry, or may be proved by data contained on memory media, such as a floppy or hard memory disk, as known in the art. A memory 24 is associated with the CPU 20 and may include both ROM portions (not shown), containing resident system software, and RAM portions.

The computer 11 contains one or more slots, sometimes referred to as expansion slots, to receive a modem card 12. Although the modem system is typically a modem card resident in an expansion slot inside the case of the computer 11 or computer system, it may also be an integral part of the computer system or it may be located external to the computer 11. The modem card 12 is adapted to be connected to wires 14 that may serve as telephone line connecting wires, in a manner known in the art. The modem card 12 including its associated hardware, circuitry, and firmware is referred to herein as "data communication equipment" (DCE).

The computer 11 is programmed to control the operation of modem circuitry 13 of design described below that is contained on the modem card 12. This control is performed by a program or algorithm that may be provided on one or more floppy disks, such as the floppy disk 16 shown that may be inserted into the floppy disk drive 17. The program contained on the floppy disk 16, or copied onto the hard disk drive of the computer 11, provides instructions for sequential execution by the CPU of the computer 11.

The modem card 12 includes the modem circuitry 13, which, using the software arrangement of the present invention, can easily be accomplished on a single chip 30. The single chip 30 can be, for example, a C25 Microcomputer available from Rockwell International Corporation, and includes a control processor 31 together with a small memory 32 (see FIG. 2). Since much of the function of the control processor 31 has been removed to the CPU of the host computer, as described below, the control memory 32 need be only large enough to enable the minimum communication control functions contained and carried out by the DCE, as below described.

The interface between the DTE and communication link 14 may be-provided with software located, in part, in the memory 32, and, in part, in the memory 24 of the host computer. The interface can be designed, if desired, to support existing data transmission protocols, such as MNP4 and LAPM error control as set forth by CCITT V.42. The DCE is minimally programmed to provide the function of a data modem with AT commands but may also include other functions such as a facsimile modem. Error correction can be added to the data modes via a high level data link control (HDLC) protocol with software located in the modem card 12 and the host computer system 11. All features of the AT command set can be retained for data mode operation, while additional capabilities may be added to facilitate V.42 error control.

In operation, the modem control program may be loaded in whole or in part into the memory 24 of the host computer 11 to provide program steps for sequential execution by the host CPU 20. The memory 24 minimally contains an Application Program Interface (API) program 29 as well as a communication software program 28. The API software containing data error correction and data compression algorithms is located in memory 24 in a manner by which its access can be controlled by the modem communication software 28.

The communications software package contained within the memory 24 can be a commercially available software package, such as, for example, "Crosstalk", distributed by Digital Communications Associates, "Mirror" distributed by Softklone, or other appropriate communication applications package. The API is linked to the communications software by techniques known in the art. As mentioned, the API includes at least the data error correction and compression algorithms that were contained in the firmware of the modem in the prior art, and is accessed directly by the communications software package within the host computer. Other data processing algorithms can also be associated with the API linked to the modem communication software 28. For example, a data packetizing algorithm for execution by the CPU can be included, if desired. This results in enabling a significant reduction of the load on the processor of the modem, as well as reducing the hardware requirements of the modem.

The API software can be linked to the communication software package by the communication software package vendor. This is accomplished, for example, by providing the desired software algorithms in a particular form, for example, in machine language format, to the software vendor. The vendor, with standard techniques, can then link the programs in the API package with the particular proprietary communication software package provided by the individual vendor.

Figure 3:
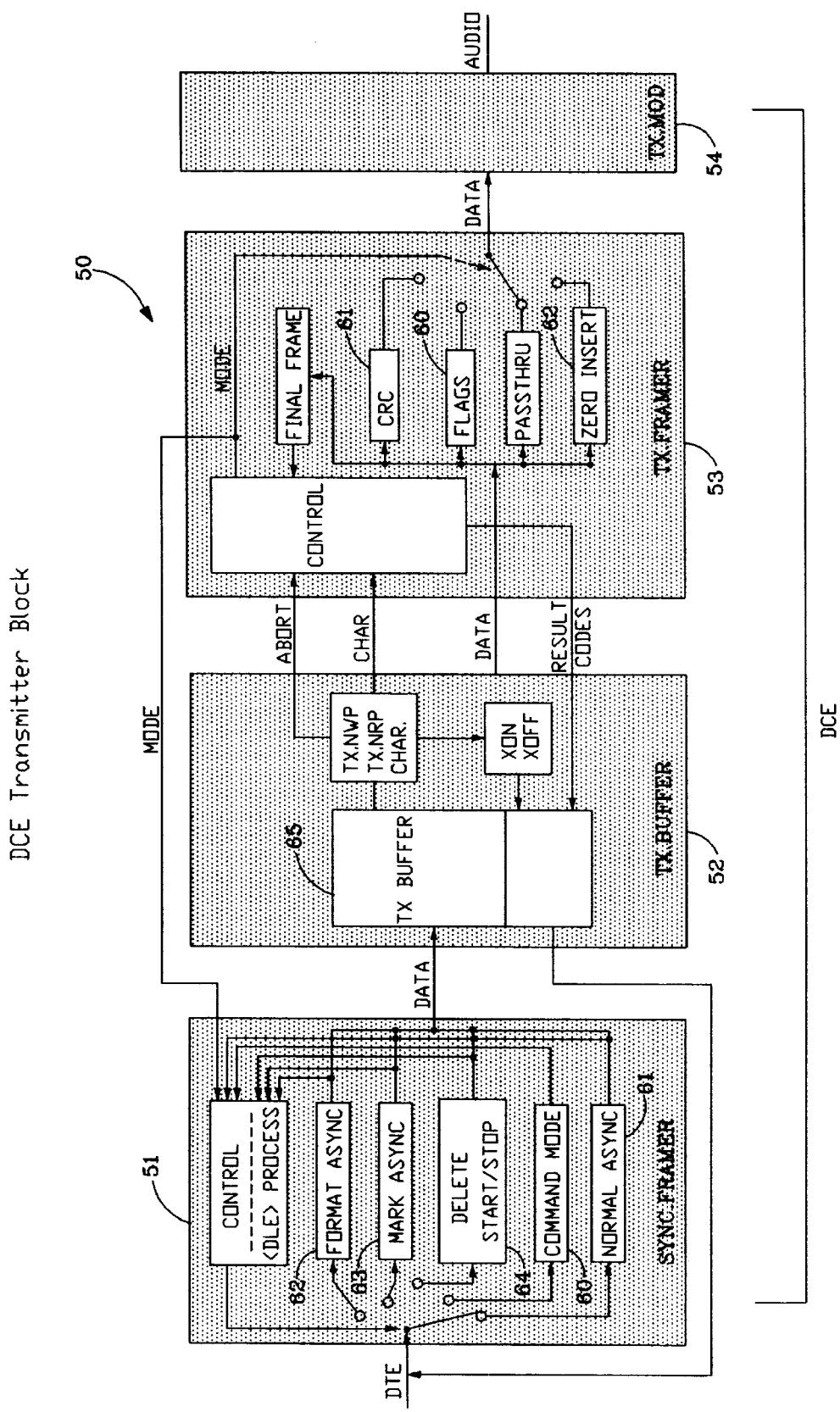
FIG. 3 is a block diagram functionally illustrating the operation of the DCE transmitter.

The function of the DCE in a transmit mode is illustrated in greater detail, with reference now to the block diagram of FIG. 3. The transmitter functions 50 in the DCE are subdivided into sync framer 51, transmit buffer 52, transmit framer 53, and transmit modulation 54 functions. The sync framer function 51 provides the interface to the DTE, and appropriately interprets and formats incoming commands and data for further processing. It supports five different operating modes including command 60, normal async 61, formatted async 62, mark async 63, and synchronous HDLC 64 modes. The transition from one mode to another, except for the mark async mode 63, is done by interpretation of the data provided by the DTE. The mark async mode 63 is automatically entered after a connection in which the modem is configured for the synchronous HDLC mode 64. Data sequences that facilitate the transition from mode to mode as well as sequences that report status are described in greater detail below with reference to TABLES I–IV. All async modes except for mark async 63 do not reformat the input data. The mark async mode 63 converts all input FF characters to 10 ones. The synchronous HDLC mode 64 reformats input data by stripping off the start and stop bits, or another asynchronous framing data.

The transmit buffer module 52 stores formatted transmit data for modulation as well as status and command responses required for the DTE in a transmitter buffer 55. The buffer length is variable depending on the mode. Flow control functions are provided to help manage the information exchange rate between the DTE and DCE.

The transmit framer module 53 provides the final data formatting prior to modulation. In synchronous mode, flags 60, CRC 61, and zero insertion 62 functions of HDLC are appended to the synchronous data stream provided by the transmit buffer module 52. Asynchronous data is not formatted and forwarded directly to the modulator.

Figure 4:
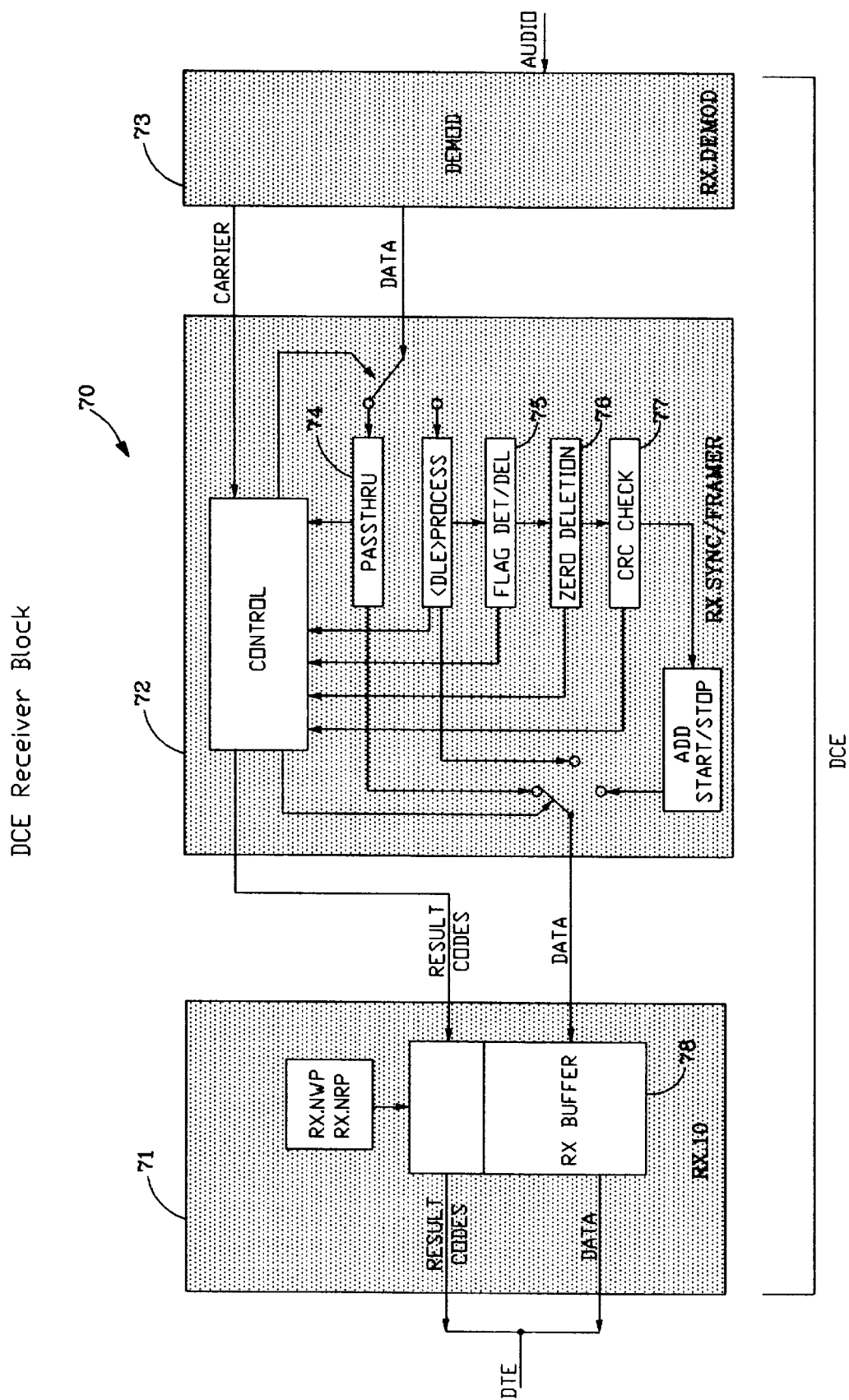
FIG. 4 is a block diagram functionally illustrating the operation of the DCE receiver.

The functions of the DCE in receive mode are shown in the block diagram of FIG. 4. The receiver functions 70 are subdivided into receiver I/O 71, receiver sync/framer 72, and receiver demod 73 functions. The analog signal received by the receiver demod 73 is demodulated and forwarded to the receiver sync framer module 72. Like the transmit sync framer 51 (see FIG. 3), the receive sync/framer 72 supports the five different data types or operating modes. It removes the operations performed by the transmit sync framer 51. In async, mode it simply passes the data 74 directly to the receiver I/O module 71. In synchronous mode, it performs flag detection and deletion 75, zero deletion 76, and CRC calculations 77 and verification. Also like transmitter functions 50, data sequences are used to facilitate the transition from mode to mode as well as reporting status. Additional details are further described below with reference to TABLES I–IV.

Output data as well as status in the form of result codes are stored in a portion of the receiver buffer 78 of the receiver I/O module 71. The receiver I/O module 71 simply buffers asynchronous data in the receiver buffer 78 for the DTE to retrieve when ready.

Figure 5:
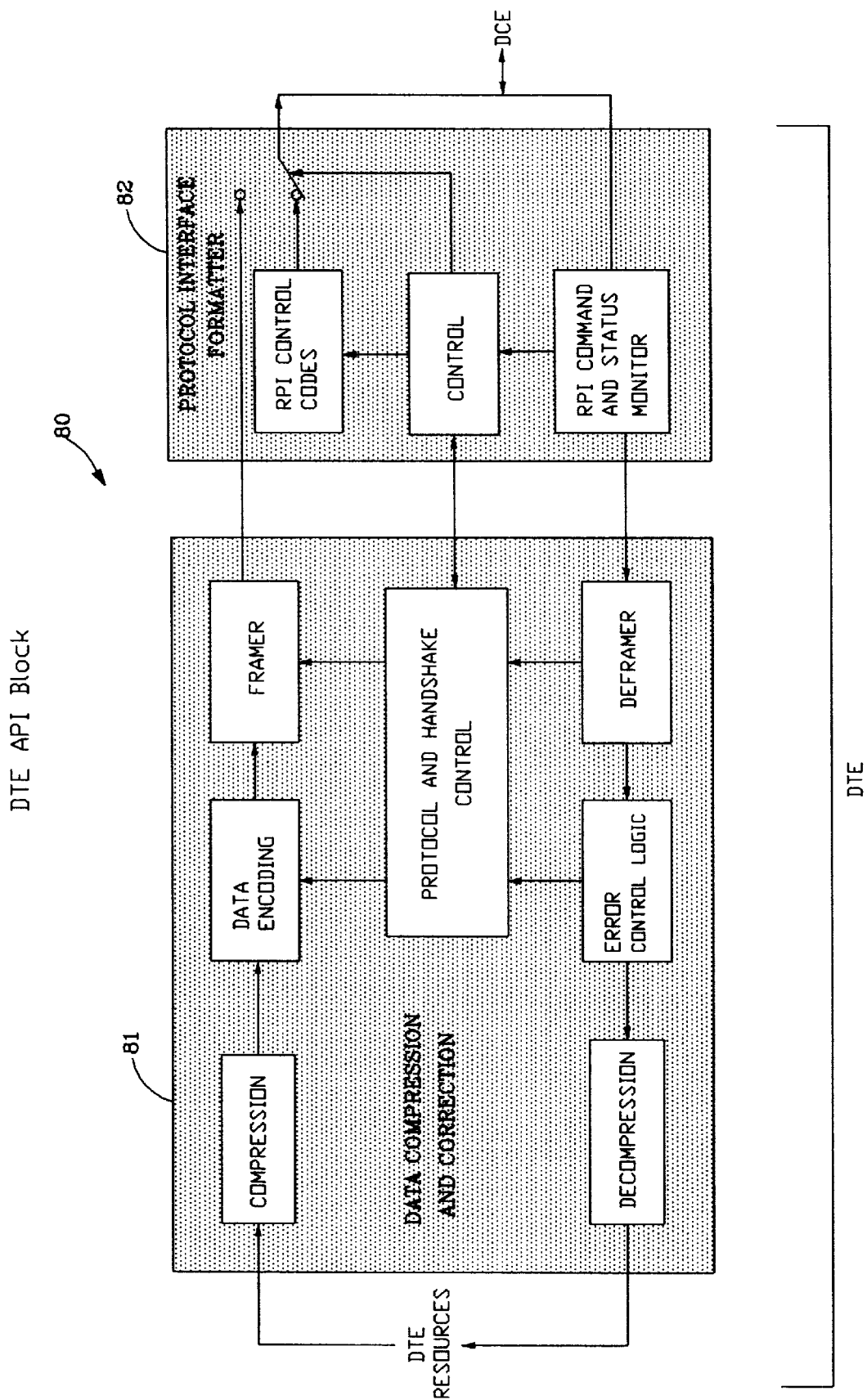
FIG. 5 is a block diagram functionally illustrating the operation of the DTE.

The DTE interface 80 required to support the redistribution of data compression and correction are shown in FIG. 5. Further DTE details identifying the interfaces between resident host software, the resident CPU, the resident memory, etc. are DTE dependent and are not shown. The DTE interface 80 comprises a data compression/correction 81 and protocol interface formatter 82 modules. The data compression and correction module 81 performs all the data compression, decompression, error correction, packet framing and deframing, and call negotiation and handshaking functions as specified in the V.42 and V.42 bis specifications.

The protocol interface formatter 82 serves as the interface between the compression and correction module 81 and the DCE. The protocol interface formatter 82 sends asynchronous data and control sequences to the DCE, and receives asynchronous data and status sequences from the DCE. It processes incoming data and issues commands compatible with transmit and receive DCE functions as described below with respect to TABLES I–IV. The timing and the sequence of mode transitions is dictated by the V.42 and V.42 bis specifications.

Issuance of the appropriately timed commands and processing and response to DCE status information allows one skilled in the art using the above defined methodology to implement a communication system that minimizes DCE cost, power, and, size.

The operation of the system, in still greater detail, follows. According to V.42 requirements, MNP4 and LAPM operate over a synchronous data link using HDLC framing. The DTE/DCE interface is asynchronous at the modem negotiated data rate (connect speed) to start, changing to a preselected speed, preferably 19.2 kbps or more, upon commencement of HDLC framing. (In general, this asynchronous data transfer rate must be at least twice the connect speed of the modem.) The following sequence must be accommodated:

1. Modem A dials modem B, then modem B answers.
2. Normal handshaking occurs, e.g., according to V.22 bis.
3. Asynchronous characters are sent in both directions to establish capability for MNP4 or LAPM. Due to the nature of these characters, the DTE/DCE interface should be 8 bits with no parity.
4. Each modem then switches to synchronous HDLC framing at the connected speed.

A Hayes-compatible modem generally initiates actions following the reception of an AT command from the DTE. Upon completion of the modem handshaking, the modem outputs a CONNECT result code to indicate that it is online. All inputs from the DTE at this point are transmitted as data. To enter a new command it is necessary to enter the escape sequence, which brings the modem into the online command state. Depending on the command entered, the modem may remain in the online command state or return to the online data state. Loss of carrier causes the modem to drop the connection and return to the offline command state.

A new protocol, in accordance with the invention, to implement HDLC fits within these constraints while in non-HDLC asynchronous data mode and while in the online or offline command state. However, since HDLC framing is controlled by DTE software rather than by manual operation, the protocol is set up to permit maximum efficiency of both the DTE and the DCE. Thus, while in synchronous or asynchronous HDLC mode, the use of verbose responses is avoided whenever possible.

The sequence of commands of the system in accordance with the invention, used to initiate a call from MODEM A to MODEM B and proceed on to synchronous HDLC is described in TABLE I. "Input" indicates DTE to DCE, while "output" is from DCE to DTE.

TABLE I

| MODEM A | MODEM B |
|---|---|
| input: AT + H1 | input: AT + H1 |
| output: OK | output: OK |
| input: ATDxxxx | output: RING |
|  | input: ATA (or auto-answer) |
| (Modem handshaking V.22bis, for example) | (Modem handshaking V.22bis, for example) |
| output: CONNECT 2400 or CONNECT 1200 (at autobaud speed) | output: CONNECT 2400 or CONNECT 1200 (at autobaud speed) |
| DTE transmits ODP and receives ADP as async characters at | DTE receives ODP and transmits ADP as async characters at |

TABLE I-continued

| MODEM A | MODEM B |
|---|---|
| connect speed | connect speed |
| input: 55 10 55 hex | input: 55 10 55 hex |
| DCE outputs code to DTE at 19.2 kbps (or other data transfer rate) to indicate data valid | DCE outputs code to DTE at 19.2 kbps (or other data transfer rate) to indicate data valid |
| DCE transmits and receives HDLC frames at connect speed; DTE/DCE interface is 19.2 kbps (or other data transfer rate) DTE inputs code to exit HDLC and waits for response (see below), then input: +++, then ATH (+++ at connect speed; modem will autobaud on ATH) | DCE transmits and receives HDLC frames at connect speed; DTE/DCE interface is 19.2 kbps (or other data transfer rate) |
| output: OK | DCE outputs code to indicate carrier loss (see below), then output: NO CARRIER (at connect speed) |

After completion of the transaction, both modems return to an offline command state. The modem which lost carrier is set to the connect speed and autobauds on the next entered command. If asynchronous framing is desired instead of or preceding synchronous HDLC, a command, for example, 55 10 CC (or other arbitrary command) can be defined to prevent the modem from translating input FF's as mark-fill. The DTE may also enter a command, such as 55 10 AA, to resume normal data mode operation. These new asynchronous online HDLC commands are described in greater detail below. The only new AT command that is required is AT+Hn, which instructs the modem whether or not to attempt to connect in HDLC mode. In synchronous HDLC data mode, the data that the modem receives from the DTE at 19.2 kbps (or other appropriate asynchronous data transfer rate) is transmitted as synchronous HDLC frames at the connected speed. Received synchronous data is converted by the modem to asynchronous and sent to the DTE.

To distinguish between data and status or command codes on the DTE/DCE interface, a shielding character is used. The expression "shielding character" is selected since it shields a short subsequent character stream from being considered as data characters. The ASCII character <(DLE> is preferred (10 hex). Ordinarily, the subsequent character stream will be only one character long, but longer streams may be accommodated by having the first character of the stream indicate the multiple-character nature of the stream. Any <DLE> character that occurs naturally in the data stream is doubled to be enabled to cross the interface. The following TABLE II lists examples of some of the status and command values that may be programmed to follow a <DLE> character.

TABLE II

|  | DTE -> DCE | DCE -> DTE |
|---|---|---|
| 00 | Status request | Status request |
| 01 | Status response | Status response |
| 03 | End of TX frame | End of RX frame, good CRC |
| 04 | TX abort sequence | RX error |
| 05 |  | TX error |
| 08 | Exit HDLC mode | Exited HDLC mode |
| 09 |  | No carrier |
| 0A |  | Received XOFF (13) as data |
| 0B |  | Received XON (11) |

TABLE II-continued

| DTE -> DCE | DCE -> DTE |
|---|---|
| 0C | as data Synchronous connection established |
| 10 Transmit <DLE> (10) as data | Received <DLE> as data |

With regard to the HDLC asynchronous commands, the AT command AT+H1 is used to set the modem to HDLC mode, while AT+H0 (or AT+H) resets the modem to normal mode, the default. The current setting of the modem can be determined by entering AT+H?, which produces a response of either 0<CR><LF> or 1<CR><LF>, followed by the OK result code. The modem can also be reset to normal mode by an &F command.

While in HDLC mode, a dial or answer command is issued, or when auto-answering an incoming ring, the modem connects in the mark-filled formatted asynchronous state. In this state, every input FF from the DTE results in the transmission of 10 marks, facilitating the transmission of the ODP or ADP. Additionally, input data from the DTE is scanned for the character sequences in the following list which define DTE-to-DCE commands, while the DTE scans received data for DCE-to-DTE status reports. All input characters to the DCE are transmitted as data. It should be noted that these characters are interpreted when the modem is online; thus, the DCE is enabled to operate simultaneously both in a command mode and in a data communication mode. Some examples of such DTE-DCE interface commands are contained in TABLE III.

TABLE III

A. 55 10 CC - Switch to Formatted Asynchronous (DTE -> DCE)
The hexadecimal sequence 55 10 CC instructs the DCE to change to formatted asynchronous mode without mark-fill. In this mode, FF characters are sent correctly, including stop and start bits. The modem, meanwhile, still interprets 55 10 xx commands, allowing the user to change to synchronous mode later. No delay is necessary after issuing 55 10 CC before transmitting further characters.
B. 55 10 55 - Switch to Synchronous (DTE -> DCE)
The hexadecimal sequence 55 10 55 instructs the DCE to proceed to synchronous mode. The DTE then waits to receive a 10 0C status code from the DCE before transmitting the first frame. During this interval the DCE switches the interface data rate from the connect speed to high speed, e.g., 4.8 or 19.2 kbps, and changes from asynchronous to synchronous data transmission and reception.
C. 55 10 AA - Escape from HDLC data mode (DTE -> DCE)
The hexadecimal sequence 55 10 AA restores the DCE to normal data mode status for the remainder of the connection. Once this sequence is detected, all characters from that point on are treated as normal data. No delay is necessary after issuing 55 10 AA before transmitting further characters. Sending 55 10 AA does not change the +H setting.
D. AA 10 AA - No carrier (DCE -> DTE)
The hexadecimal sequence AA 10 AA is sent to the DTE to indicate carrier loss, which causes the DCE to halt formatted asynchronous operation and return to normal asynchronous mode. This code is used when in both mark-filled and non-mark-filled modes. The modem drops the line, outputs the NO CARRIER result code at least 500 microseconds after sending AA 10 AA and returns to command mode. Sending AA 10 M does not change the +H setting.

With respect to the HDLC synchronous status and commands, the interface between the DTE and the DCE is full are duplex. When the modem (or terminal) detects a <DLE> character <10 hex> in data stream, it checks the next byte for status. If the next byte is also a <DLE> then a single <DLE> is considered to be in the transmit (or receive) data. Likewise, if the modem (or terminal) needs to indicate status or send a command, it sends <DLE> followed by the status or command code. An invalid code received by the terminal or modem is ignored. Data being transferred is screened for <DLE> characters, and these are doubled to avoid misinterpretation. The modem also screens the received data for XOFF and XON characters. These are replaced with the status codes 0A and 0B respectively (see below, since XOFF and XON are used for flow control. The following TABLE IV shows examples of various status and command codes that can be programmed.

TABLE IV

A. 00 - Request for status
The DTE (or DCE) sends to the DCE (or DTE) the sequence 10 00 to request current modem (or terminal status. If the status response (code 01) indicates that the DCE is currently in an XOFF condition, the DTE cannot send another status request until receiving an XON (<DC1>).
B. 01 - Status response
In response to a request for status, the DCE (or DTE) sends 10 01 xx, where xx contains the following information:
Bit 0:    1 = Currently XON (DCE only)
Bit 1:    1 = Receiving HDLC flags or mark idle between frames (DCE only)
Bit 2:    1 = Received frame abort and awaiting flags (DCE only)
Bit 3:    1 = Transmit buffer overflowed or underflowed; awaiting abort command (DCE only)
Bits 4–7:  Reserved
The DCE begins sending its response delayed approximately asynchronous character time (0.5 ms at 19,200 bps, for example) after receiving the second byte of the status request. The maximum response time for the DTE is 2N+2 bytes, where N is the length of the transmit and receive UART buffers. For a 16450, N is 2. Although currently there is no need for the DCE to request DTE status, this mechanism is defined as bidirectional for future expansion.
C. End of frame, or end of frame with good CRC
The DTF appends the sequence 10 03 (<DLE> <ETX>) to the end of a frame as a frame terminator. This instructs the modem to transmit the CRC bytes and then flags; (The characters <DLE> <ETX> are not transmitted as part of the data.) No CRC bytes are transmitted if the modem is already transmitting flags or frame abort. The DCE sends to the DTE the sequence 10 03 at the end of a received frame to indicate that the CRC check did not detect any errors in the frame. The two CRC bytes are included along with the data and should be discarded by the DTE.
D. 04 - Transmit abort sequence, or receiver error
The DTE sends to the DCE the sequence 10 04 to instruct the modem to abort the frame. The modem does this by transmitting FF hex as an abort sequence (at least 7 consecutive ones are required). This is followed by at least one flag to serve as the starting flag for the next frame. No frame abort sequence is transmitted if the modem is already transmitting flags or a frame abort.
The DCE sends to the DTE the sequence 10 04 at the end of a received frame if the CRC check detects an error somewhere in the frame. Also, if the DCE receives 7 consecutive ones during a frame, it terminates the frame being transferred to the terminal with 10 04 and waits for flags. Note: some older modems transmit mark idle between frames, with only beginning and ending flags to mark the frame boundaries. Although this is non-standard HDLC, it is accommodated by the modem

TABLE IV-continued receiver. Mark idle between frames does not constitute a frame abort.

E. Transmit data error
The DCE sends to the DTE the sequence 10 05 to indicate that the transmit data buffer in the modem has overflowed or underflowed. These conditions cause the modem to transmit the abort sequence FF followed by flags until the next frame is input from the DTE following a 10 04 command as an acknowledgment of the error.

F. Exit HDLC mode, or exited HDLC mode
The DTE sends to the DCE the sequence 10 08 to request that the modem return to normal asynchronous data mode. The DCE responds with 10 08 (at the asynchronous data transfer rate) to indicate that the modem has switched to asynchronous mode, and that all further. DTE/DCE I/O is at the connect speed.

G. No carrier
The DCE sends to the DTE the sequence 10 09 to indicate carrier loss, which causes the DCE to halt HDLC operation and return to asynchronous mode. The modem drops the line, outputs the NO CARRIER result code at the connect speed and returns to command mode.

H. 0A - Received XOFF (13 hex) as data
The DCE sends the sequence 10 0A to the DTE to indicate that the XOFF character <DC3> (13 hex) was received as data.

I. 0B - Received XON (11 hex) as data
The DCE sends the sequence 10 0B to the DTE to indicate that the XON character <DC1> (11 hex) was received as data.

J. 0C - Synchronous connection established
The sequence 10 0C is sent by the DCE to notify the DTE that the modem has synchronized to received HDLC flags. Data sent to the DTE following this code is valid HDLC data.

K. 10 - Transmit or received <DLE> (10 hex) as data
Transmitting or receiving two consecutive <DLE> characters indicates that <DLE> (10 hex) should be transmitted, or was received, as data.

It is the responsibility of the DCE to provide asynchronous-to-synchronous data conversion and HDLC support to simplify the implementation of V.42 error-correction in the DTE.

The DCE functions as a normal data modem when the +H setting is zero. The +H command is described in greater detail below. It should be noted that the +H setting only affects online operation. While in the command state, the modem accepts and acts on any of the commands supported by the modem regardless of whether +H0 or +H1 has been selected. The modem begins interpretation of commands 125 milliseconds following the input of the <CR> of the command line, while a new command may be entered 500 microseconds following the last character of the response. Responses to commands, if enabled, are numeric (e.g. 0<CR>) or verbose (e.g. <CR><LF>OK<CR><LF>) depending on whether V0 or V1 is selected.

In HDLC data mode, the data that the modem gets from the DTE is transmitted as synchronous HDLC frames at the connected speed. At least 16 flags are transmitted by the DCE prior to transmitting the first frame. When the modem has detected 3 consecutive flags for the first time since commencing synchronous operation, it sends the 10 0C code to the OTE as a "data valid" indicator. The modem performs the async-to-sync conversion, zero insertion, and CRC-CCITT (16 bit) calculation. When there is not data available the modem transmits flags. A break in the data without a valid frame terminator causes the modem to transmit the abort sequence. Similarly, upon receiving the frame, the modem removes the inserted zeros, detect the reception of flags or abort sequences, calculate the CRC to validate or invalidate the frame, and convert the data to asynchronous to send to the DTE at the interface rate. In addition, the modem detects mark idle between frames, which is used by some older modems instead of continuous flags, and not confuse this with a frame abort. The current receive status, plus the current XON/XOFF state, is stored in a byte to be sent to the DTE as a status response upon receipt of a status request. Although provision can be made to allow the DCE to request status from the DTE, this does not seem to be necessary. If carrier is lost, the DCE sends a 10 09 code to the DTE at the interface rate, wait at least 500 microseconds, then send the NO CARRIER result code to the DTE at the connect speed, drop the connection, the return to the AT command state.

Since the DTE/DCE interface runs at a higher rate than the transmit data rate, there is buffering in the modem to store up a reserve of data to transmit. The amount of data in this buffer is regulated by sending XON and XOFF characters to the DTE. Incoming requests for status (10 00) from the DTE are interpreted as soon as they are read in. The DCE should respond to a status request immediately, which yields a 2.1 milliseconds response time. Other command and status codes, such as 10 03, 10 04, 10 08, 10 0A, 10 0B and 10 10, are stored in the transmit data buffer to be interpreted after the preceding data has been transmitted.

If there is insufficient room in the transmit data buffer to store the incoming data, or if the transmit buffer becomes empty without a frame terminator (10 03 or 10 04), the modem sends a transmit error (10 05) ahead of any receive data. Note that there are always 2 bytes available to store a command or status code. In either case, the DCE transmits the abort sequence, FF hex, followed by flags. All data stored in the transmit buffer prior to an overrun is transmitted before the frame abort sequence. The DCE waits for a 10 04 code from the DTE as an acknowledgement of the overrun or underrun. Data following the 10 04 is transmitted as a new frame after at least one flag has been transmitted. Although the DCE ignores input data while in a transmit error state (i.e., while waiting for 10 04), it accepts and follows the status request (10 00) and exit HDLC (10 08) commands.

Receive data is stored in a buffer to be sent to the DTE. The modem ensures that there is always room to store an end-of-frame indicator (10 03 or 10 04) and an end-of-HDLC (10 08 or 10 09) following the current data byte. Therefore, to store a byte of data in the buffer, there must be 5 bytes available, or 6 if the received character is an XON, XOFF, or <DLE>. Additional bytes should be reserved in the receive buffer to accommodate latency in interrupt servicing by the DTE.

Most status codes are placed in the receiver buffer to mark their occurrence with respect to the data. The exceptions are 10 01 and 10 05, which are sent to the DTE ahead of any bytes in the receiver buffer.

On the other hand, it is the responsibility of the DTE to implement V.42 including the error-control capabilities of MNP2–4 and LAPM using the HDLC framing protocol supported by the DCE. Implementation of the data compression capabilities of V.42 bis and MNP5 resides entirely within the DTE and is invisible to the DCE.

The DTE establishes a connection using AT commands, transmit the correct asynchronous sequence, recognize and interpret received asynchronous characters, and set the modem to synchronous mode by sending 55 10 55 to the DTE as outlined below. The DTE then waits to receive a 10 0C code from the DCE to verify that the DCE has synchronized to received flags. Data following the 10 0C is valid.

The DTE formats frames, including those used for establishing protocol (e.g., XID frame), and transfers these to the DCE as asynchronous characters, which are then transmitted as synchronous HDLC frames by the DCE. The DTE reads received frames as asynchronous characters from the DCE, terminated by 10 03 (CRC correct) or 10 04 (frame error). With a 10 03, the last two bytes prior to the terminator are the received CRC and should be discarded. A frame error indicates either a CRC error or a frame abort. In both cases, the received frame is invalid, and the DTE should request a retransmission. Interpretation of received frames is the responsibility of the DTE. To exit HDLC, the DTE sends to the DCE a 10 08 code, waits to receive a 10 08 code as confirmation, then resumes normal data mode operation at the connect speed after 500 microseconds. Receiving a 10 09 code from the DCE indicates that the carrier has dropped. The DTE should switch back to the connect speed within 500 microseconds to receive the NO CARRIER result code.

Flow control from the DCE to the DTE uses XON (ASCII <DC1>, 11 hex) and XOFF (ASCII <DC3>, 13 hex). The DCE also provides a CTS signal that may optionally be used for flow control (on meaning XON, off meaning XOFF); however, the <DC1> and <DC3> characters still need to be removed from the data stream. Because only limited buffering is available on the modem, the DTE responds immediately to XOFF and XON directives from the DCE. The actual delay that the DCE needs to accommodate is 2N+2 byte intervals, where N is the length of the UART's transmit and receive buffers. For a 16450, N is 2. Due to the constraints placed on response time and buffer size, a 16550 UART is run in 16450 mode. The DTE needs to keep the modem's transmit data buffer full to allow for temporary DTE distractions without causing a transmitter underrun.

The DTE responds to DCE interrupts within 2 milliseconds to avoid losing receive data. If the DTE UART receiver overrun bit is set, the DTE sends a status request. (10 00) to the DCE, since the lost characters may have been control characters. If the status response (10 01 xx, where xx is the status) indicates that the modem is currently in an XOFF state, the DTE immediately halts its transmissions to the DCE until an XON is received. Otherwise, the DTE may continue to send transmit data to the DTE. In either case, since data has been lost from the current receive frame, all incoming data should be discarded by the DTE until some type of end-of-frame indicator, such as 10 03, 01 04, or 10 09, has been received from the modem. Data received after a 10 03 or 10 04 is a new frame and is valid. However, if the status response from the DCE showed that the modem is receiving flags or mark idle or received frame abort, the DTE may assume that it missed the end-of-frame marker, and that the next byte of data it receives is the start of a new frame. The DTE should then send a frame requesting a retransmission from the remote modem (for status other than 10 09).

If the DTE receives a transmit error (10 05) status code from the DCE, the DTE sends a frame abort (10 04) to the modem. The DTE may send the remainder of the frame first, but it will not be transmitted. The transmit overrun or underrun causes the DCE to automatically transmit a frame abort sequence followed by flags until a 10 04 or 10 08 is received from the DTE. The 10 04 command in this instance does not cause the modem to transmit an additional frame abort, since one has already been transmitted, but instead acts as a frame terminator. Any data obtained from the DTE after the 10 04 is considered to be a new frame and is transmitted. The use of the frame terminator 10 03 is avoided to avoid a possible timing hazard due to I/O buffering in the DTE UART. If the DTE chooses to abort a frame, sending a 10 04 to the modem during a frame causes the modem to transmit the frame abort sequence followed by flags until new data is sent from the DTE. Regardless of who initiates the frame abort, the DTE needs to retransmit the entire aborted frame, since it would have been ignored by the remote modem.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A communication system used with a host processing system that executes an application program, said communication system comprising:

a communication link;

a communication circuit coupled to said communication link; and a communication interface program executed by said host processor, said communication interface program enabling communication between said application program and said communication circuit;

wherein said communication interface program performs parameters negotiation, for a data error correction scheme, with a remote communication system over said communication link using a first data format and performs data error correction with said remote communication system over said communication link using a second data format.

2. The communication system of claim 1, wherein said first data format is an asynchronous data format.

3. The communication system of claim 1, wherein said second data format is a synchronous data format.

4. The communication system of claim 3, wherein said synchronous data format is HDLC.

5. The communication system of claim 1, wherein said parameters negotiation includes negotiating at least one communication circuit parameter.

6. The communication system of claim 1, wherein said negotiation includes negotiating data compression capability.

7. The communication system of claim 1, wherein said remote communication system includes a communication circuit for negotiating said data error correction for said remote communication system.

* * * * *